United States Patent
Grosse Bley et al.

(10) Patent No.: US 8,294,456 B2
(45) Date of Patent: Oct. 23, 2012

(54) LEAK DETECTOR COMPRISING A POSITION DETERMINING SYSTEM FOR THE HAND-OPERATED PROBE

(75) Inventors: Werner Grosse Bley, Bonn (DE); Gerhard Küster, Köln (DE)

(73) Assignee: Inficon GmbH, Cologne (DE)

( * ) Notice: Subject to any disclaimer, the term of this patent is extended or adjusted under 35 U.S.C. 154(b) by 348 days.

(21) Appl. No.: 12/670,939

(22) PCT Filed: Jul. 28, 2008

(86) PCT No.: PCT/EP2008/059894
§ 371 (c)(1),
(2), (4) Date: Jan. 27, 2010

(87) PCT Pub. No.: WO2009/016160
PCT Pub. Date: Feb. 5, 2009

(65) Prior Publication Data
US 2010/0253376 A1 Oct. 7, 2010

(30) Foreign Application Priority Data
Jul. 31, 2007 (DE) .......................... 10 2007 035 932

(51) Int. Cl.
*G01B 7/14* (2006.01)
(52) U.S. Cl. ............... 324/207.17; 73/40.7; 324/207.15; 340/605
(58) Field of Classification Search .................. 73/23.4, 73/31.03
See application file for complete search history.

(56) References Cited

U.S. PATENT DOCUMENTS

| | | | | |
|---|---|---|---|---|
| 3,645,127 A | * | 2/1972 | Mongodin et al. | 73/40.7 |
| 3,786,675 A | * | 1/1974 | Delatorre et al. | 73/25.03 |
| 4,294,106 A | * | 10/1981 | Gevaud et al. | 73/40.7 |
| 4,665,385 A | * | 5/1987 | Henderson | 340/539.26 |
| 4,793,355 A | * | 12/1988 | Crum et al. | 600/409 |
| 4,945,305 A | | 7/1990 | Blood | 324/207.17 |
| 5,341,671 A | * | 8/1994 | Baret et al. | 73/40.7 |
| 5,347,845 A | * | 9/1994 | Kepler | 73/31.03 |
| 5,828,770 A | * | 10/1998 | Leis et al. | 382/103 |
| 5,851,183 A | * | 12/1998 | Bucholz | 600/425 |
| 7,051,577 B2 | * | 5/2006 | Komninos | 73/40.5 A |
| 7,156,976 B2 | * | 1/2007 | Bley | 205/784 |
| 7,573,258 B2 | * | 8/2009 | Anderson | 324/207.17 |
| 2005/0027195 A1 | * | 2/2005 | Govari | 600/433 |
| 2005/0263727 A1 | * | 12/2005 | Noda | 250/559.29 |

FOREIGN PATENT DOCUMENTS

| | | |
|---|---|---|
| DE | 10 2005 022 157 | 11/2006 |
| WO | WO 03/008923 | 1/2003 |
| WO | WO 2006/069877 | 7/2006 |

OTHER PUBLICATIONS

International Search Report for PCT/EP2008/059894 dated Jul. 1, 2009.

* cited by examiner

*Primary Examiner* — Richard Isla Rodas
(74) *Attorney, Agent, or Firm* — Ohlandt, Greeley, Ruggiero & Perle, LLP

(57) ABSTRACT

The leak detector comprises a basic unit that is connected to a probe by a hose. The probe tip is placed against test zones of the test object. In case that test gas escapes from the test object, this is detected by a test gas detector in the base unit. According to the disclosure, a position determining system is provided which comprises a transmitter, a receiver that is disposed inside the probe, and a supply and evaluation unit. Thereby, the presence of the probe tip in the individual test zones is monitored and confirmed.

8 Claims, 2 Drawing Sheets

LEAK DETECTOR COMPRISING A POSITION DETERMINING SYSTEM FOR THE HAND-OPERATED PROBE

BACKGROUND

1. Field of the Invention

The disclosure relates to a leak detector for detection of leaks on a test object.

2. Discussion of the Background Art

A leak detector is described e.g. in DE 10 2005 022 157 A1 (Inficon). This leak detector comprises a probe whose probe tip will be placed against predetermined test regions of a test object. The test object is filled with a test gas, e.g. helium. Via said probe tip, test gas that is leaking out will be sucked by a basic unit and will be supplied to a test gas detector which can be designed e.g. as a mass spectrometer.

When use is made of leak detectors, the test object, e.g. an air conditioning system or the cooling aggregate of a refrigerator, will be filled with a test gas, and with the aid of a probe it will be detected whether test gas is leaking out of the test object. In quality inspection of products in industry, the probe tip has to be applied to specific test points or test regions of the test object where a danger of leakage exists. In doing so, one will move the probe to the critical sites manually. In this process, it is difficult to verify that the probe tip has been guided onto all required test regions of the test objects and has been held to each test region long enough. A danger exists that the operating person might inadvertently omit certain test regions or skip other test regions which he considers to be uncritical in his subjective estimation. According to another leak detection method, it is provided that a test gas, issuing from a nozzle tip, will be sprayed from the outside onto the test object at selected points. The interior of the test object has been evacuated and connected to a test gas detector. The test gas detector is operative to detect when test gas has penetrated from the outside into the test object.

It is an object of the disclosure to provide a leak detector which offers increased safety from faulty handling and skipping of test regions.

SUMMARY

The leak detector comprises a position determining system for contactless determination of the position of the probe tip. The control unit will store an object position of the test object and will output a confirmation signal if the position of the probe tip that has been determined by the position determining system is located in the test region. In this manner, the guiding of the probe tip to the individual test regions is monitored through a contactless position determining system. The position determining system allows for three-dimensional position determination of the probe tip in space. In combination with the control unit, the position determination system makes it possible to monitor the manual process of searching for leaks in predetermined test regions. In this manner, human errors in operating the leak detector can be avoided. Further, logging of the test process is possible for later evidence of the rule-conforming and complete performing of the test.

Contactless position determining systems are generally known. For instance, DE 199 55 646 A1 (BMW) describes a method for assigning a tool to a workpiece conveyed on an assembly line. In the region of the assembly line, a transmitter is arranged, and a receiver is arranged on the tool. The distance from the tool to each transmitter will be determined on the basis of the propagation time of the signal. Further, there exist systems for GPS-like radiolocation and systems based on triangulation by use of IR laser diodes. Nearly all of these systems require an undisturbed visual contact between transmitter and receiver, which cannot be guaranteed within an industrial environment in the presence of an operating person.

Described in U.S. Pat. No. 4,945,305 (Ascension) is a position determining system comprising a transmitter for generating a pulsed DC magnetic field, and a receiver arranged on the object. This method is particularly suited for determination of an instantaneous position, comparison thereof to a desired position and feedback. No disturbance will be caused by non-magnetic objects in the line of sight between the transmitter and the receiver. Residual disturbance by large masses of magnetizable metal such as e.g. a compressor block and a refrigerating machine, can be eliminated by calibration because the to-be-checked arrangement is static. This method has been found to be particularly useful for the realization of the disclosure.

The leak detector of the disclosure is particularly suited for performing the usual leak detection method wherein the test object is filled with a test gas and the escape of the test gas is monitored with the aid of the probe. A further leak detection system within the framework of the present disclosure resides in that, instead of using a suction probe, use is made of a probe with test gas issuing therefrom. In this case, the interior of the test object will be evacuated, and test regions of the test object will be sprayed with the test gas from the outside. Intrusion of test gas into the test object is indicative of a leak.

For certain applications, it is sufficient if the test object assumes a predetermined object position, e.g. by placing it on a template. Thus, the object position is stationary. The data of the object position are permanently stored in the control unit. In case, however, that the object position has not been exactly predetermined, it is provided according to a preferred embodiment of the disclosure that the supply and evaluation unit is designed to measure the object position of the test object in a preparatory phase and then to determine the test region. The object position can be measured by applying the probe tip to specific reference points of the test object, wherein the positions of the reference points will be measured. On this basis, the position and the orientation of the test object can then be determined.

Preferably, the position determining system comprises a stationary transmitter for generating a pulsed DC magnetic field, and the probe comprises a receiver responding to said DC field. In comparison to AC magnetic fields, this manner of position determination has the advantage that no eddy currents are generated in metallic components. Basically, it is possible, for detecting the position of the probe, to fasten the transmitter on the probe and to arrange a plurality of receivers at stationary positions distributed in space. The transmitter and the receiver can communicate with each other by ultrasound, radio waves, infrared radiation or in some other manner.

For leak detection, determining the position of the probe tip is important. In the ideal case, the receiver of the position determining system is arranged on the probe tip. Since, however, the probe tip consists of the end of a relatively slim tube, it will in certain cases not be possible to accommodate the sensors of the receiver at this site. A preferred embodiment of the disclosure provides that the receiver of the position determining system, arranged in a body of the probe, comprises sensors which make it possible to determine the position and orientation of the body of the probe, and that the position of the probe tip will be computed on the basis of the data of the position and orientation of the body of the probe. The position will be determined by three translatory coordinates x, y and z, and the orientation angles $\alpha$, $\beta$, $\gamma$ will be determined as well.

In this manner, the position is detected in six degrees of freedom, and the position determination is performed by evaluation of three field vectors of a pulsed DC magnetic field. By the 6-axes evaluation, it is rendered possible to accommodate the magnetic field sensor on the body of the probe at a distance from the probe tip and nonetheless to detect the exact position of the probe tip. This is important since, due to the high mechanical abrasion, the probe tip should be designed in a manner allowing it be exchanged while the expensive and delicate sensor can remain in the body of the probe.

The disclosure allows for operator-guided movement to each individual test region of the test object. The test region is to be understood herein as a test point or a surrounding spherical volume in which a valid test process can take place.

The disclosure further relates to a method for examining a test object for leaks. This method is characterized in that the position of the probe tip is measured by use of a contactless position determining system and that a respective actuation signal is generated when the measured position reliably coincides with the position of the test region for a predetermined minimum time period and an unambiguous leakage rate signal has been measured and stored.

An embodiment of the disclosure will be explained in greater detail hereunder with reference to the drawings.

DETAILED DESCRIPTION OF THE PREFERRED EMBODIMENT

Figure 1:
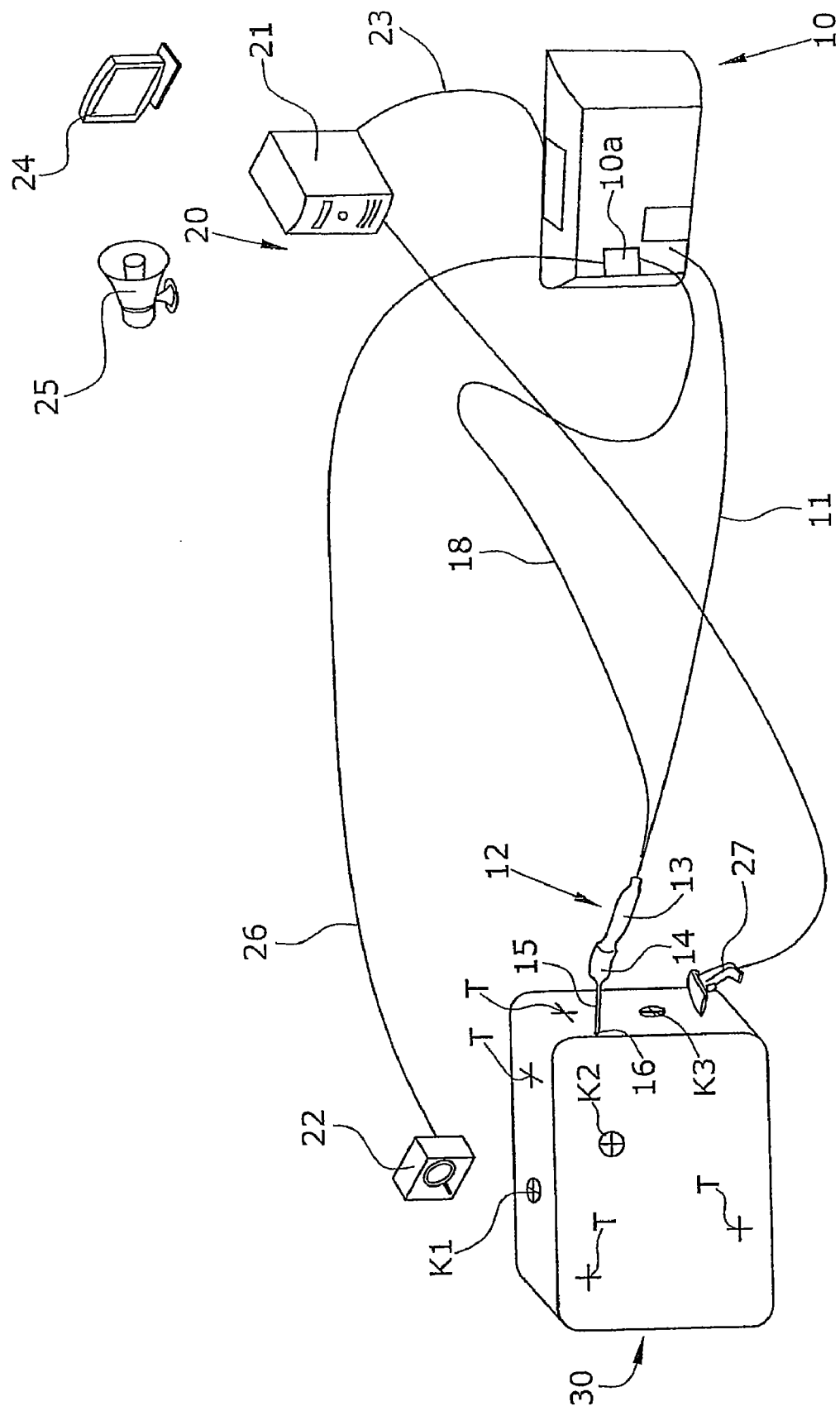
FIG. 1 is a schematic representation of a leak detector according to the present disclosure.

The illustrated leak detector is operative as a sniffing leak detector. This detector comprises a base unit 10 which is generally configured as described in DE 10 2005 022 157 A1. Said base unit 10 comprises a vacuum generator and a test gas detector which is e.g. formed as a mass spectrometer. From base unit 10, a flexible hose 11 leads to the probe 12. Probe 12 comprises a handle 13 and a body 14. Extending from body 14 is a tube 15 whose open end forms the probe tip 16. Hose 11 includes a hose lumen via which the vacuum that is generated in base unit 10 will suck outside air through probe tip 16.

Figure 2:
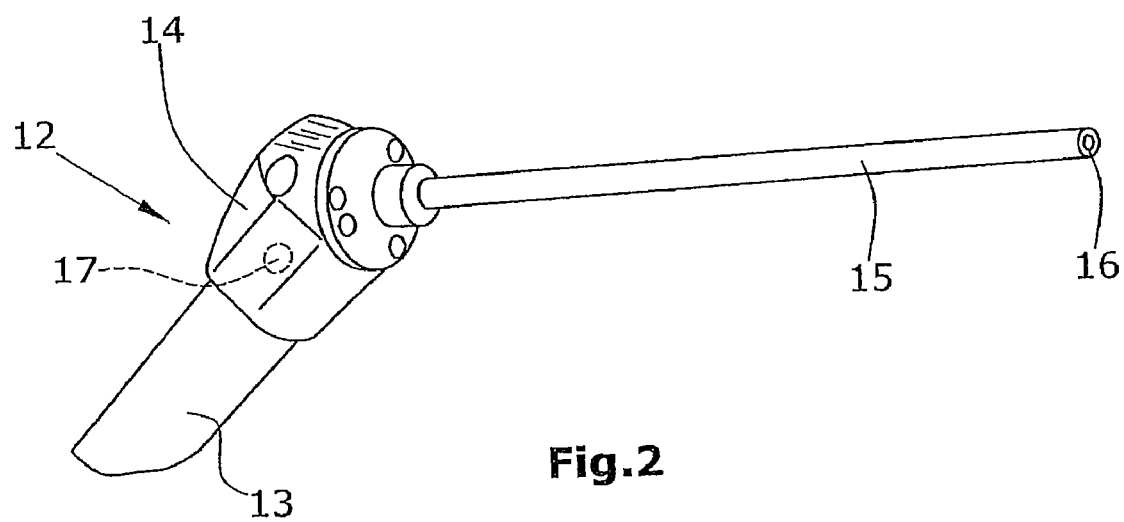
FIG. 2 is a perspective view of the probe.

In FIG. 2, probe 12 is shown in enlarged perspective view. Body 14 includes a receiver 17 which in the present case consists of six electromagnetic coils responding to magnetic fields and respectively to the variation of said fields over time. Receiver 17 is connected to a receiver cable 18 (FIG. 1) supplying the sensor signals of the receiver to base unit 10.

Base unit 10 includes a supply and evaluation unit 10a forming a part of the base unit. The position determining system 20 comprises apart from receiver 17—a transmitter 22 and a supply and evaluation unit 10a. Supply and evaluation unit 10a is operative, on the one hand, to feed current to transmitter 22 and, on the other hand, to evaluate the raw signals of receiver 17 to the effect that "true" position coordinates will be transmitted from base unit 10 to control unit 21. In the process, the earth's magnetic field and other disturbing factors as well as the distance of receiver 17 from probe tip 16 will be computationally eliminated. Further, the supply and evaluation unit 10a computes the positional deviation between the position of the receiver and that of the probe tip. The receiver signals will be converted into corrected position coordinates, and these will be transmitted via an interface to control unit 21. Control unit 21 is a computer communicating with base unit 10 via a cable 23. Belonging to control unit 21 are a monitor 24 and a signaler 25, e.g. in the form of an acoustic signal generator. Transmitter 22 is connected to base unit 10 via a transmitter cable 26. Thus, in base unit 10, there is performed the determination of the position coordinates on the basis of the signals from transmitter 22 and receiver 17 whereas the fixation of the desired coordinates and the storage of the measured leakage rates along with the appertaining position is performed by control unit 21.

Further provided is a scanner 27 in the form of a bar code reader for scanning an identification on test object 30 and for identifying the type of the test object. Said scanner 27 is connected to control unit 21.

On test object 30, which in FIG. 1 is only schematically outlined as a block, a plurality of calibrating points K1,K2,K3 are visibly marked. Here, these calibrating points have been applied to surfaces oriented at right angles relative to each other. During a preparatory phase, the position of test object 30 is determined by guiding the probe tip 16 to each of said calibrating points K1,K2,K3 while transmitter 22 and receiver 17 together with supply and evaluation unit 10a perform a respective position determination. In this manner, the position data of test object 30 are detected and then stored in control unit 21. These position data of the object position of the test objects are reference data for the individual test regions T. The test regions are sites on the test object which are especially in need to be tested for leaks. These test regions T are fixed in relation to the test object. When the object position has been detected, the positions of the test regions T will be computed (as absolute positions).

The operating person will now guide the probe tip 16 to each individual test region T. As soon as the probe tip has reached a test region T, a signal will be sounded at the signaler 25. The operating person will then hold the probe tip to the test region for a specified minimum time period. Upon lapse of said minimum time period, a second signal will be sounded which indicates that a usable measurement value has been captured and the test on this test region has been completed.

These test regions T can be serially numbered so as to set the order in which the test regions have to be serviced. Thereby, a complete operator guidance to each potential leak is made possible. It is safeguarded that no test region will have been neglected or skipped. Further, it is safeguarded that the probe tip will have been placed on each test region for a sufficient length of time.

Within the framework of the present disclosure, various modifications of the above described embodiment are possible. Thus, for instance, the supply and evaluation unit 10a can also be arranged externally of the basic unit, e.g. in a separate box.

What is claimed is:

1. A leak detector for detection of leaks on a test object, comprising:
   a basic unit,
   a hand-guided probe comprising a probe tip and being connectible to the basic unit via a hose,
   a position determining system, provided for contactless detection of the position of the probe tip,
   a supply and evaluation unit that stores an object position of the test object as well as at least one position of a test region on the test object, and
   a signal generator that generates an actuation signal when the position of the probe tip, detected by the position determining system, coincides with the position of the test region.

2. The leak detector according to claim 1, wherein the supply and evaluation unit is designed to measure, in a preparatory phase, the object position of the test object and to determine the absolute position of at least one test region.

3. The leak detector according to claim 1, wherein the position determining system comprises a stationary transmitter generating a pulsed DC magnetic field, and the probe includes a receiver responsive to said DC field.

4. The leak detector according to claim 3, wherein the supply and evaluation unit is designed to supply current pulses to the stationary transmitter and to convert the receiver signals into corrected position coordinates and to output said position coordinates via an interface to a control unit.

5. The leak detector according to claim 3, wherein said receiver of the position determining system, arranged in a body of the probe, comprises a plurality of sensors allowing for determination of the position and orientation of the body of the probe, and the position of the probe tip is obtained on the basis of the data on the position and orientation of the body of the probe.

6. The leak detector according to claim 5, wherein the probe tip is provided on a tube exchangeably fastened to the body of the probe.

7. A method for examining a test object for leaks with the aid of a probe, comprising the steps of:
- fixing the position of at least one test region on the test object,
- positioning a probe tip of the probe on the test region, and
- detecting whether a test gas is leaking into or out of the test region,
- wherein the position of the probe tip is measured by a contactless position determining system, and a respective actuating signal is generated when the measured position coincides with the position of the test region for a specified minimum period of time, and a usable leakage rate value has been taken over from a control unit and has been stored.

8. The method according to claim 7, wherein, in a preparatory phase, the position of the test region is determined, the probe tip is held to calibrating points of the test object and correction data for position evaluation are obtained and stored.

* * * * *